US012620815B2

(12) United States Patent
Wei

(10) Patent No.: US 12,620,815 B2
(45) Date of Patent: May 5, 2026

(54) CHARGER, DATA CABLE, AND CHARGING DEVICE

(71) Applicant: VIVO MOBILE COMMUNICATION CO., LTD., Guangdong (CN)

(72) Inventor: Junchen Wei, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 801 days.

(21) Appl. No.: 17/992,962

(22) Filed: Nov. 23, 2022

(65) Prior Publication Data

US 2023/0082918 A1     Mar. 16, 2023

Related U.S. Application Data

(63) Continuation of application No. PCT/CN2021/096694, filed on May 28, 2021.

(30) Foreign Application Priority Data

May 29, 2020     (CN) .......................... 202010479652.3

(51) Int. Cl.
| | |
|---|---|
| *H02J 7/00* | (2026.01) |
| *H01R 13/20* | (2006.01) |
| *H02J 7/42* | (2026.01) |
| *H02J 7/50* | (2026.01) |

(52) U.S. Cl.
CPC ................ *H02J 7/42* (2026.01); *H01R 13/20* (2013.01); *H02J 7/575* (2026.01)

(58) Field of Classification Search
USPC ......................................................... 320/107
See application file for complete search history.

(56) References Cited

U.S. PATENT DOCUMENTS

| | | | |
|---|---|---|---|
| 2015/0264208 A1 | 9/2015 | Achiwa et al. | |
| 2015/0346790 A1 | 12/2015 | Talmola | |
| 2015/0349561 A1* | 12/2015 | Berggren | ............... G06F 1/266 |
| | | | 320/162 |
| 2017/0038810 A1 | 2/2017 | Ueki | |
| 2017/0040820 A1 | 2/2017 | Ono | |

(Continued)

FOREIGN PATENT DOCUMENTS

| | | |
|---|---|---|
| CN | 106992372 A | 7/2017 |
| CN | 107706685 A | 2/2018 |

(Continued)

*Primary Examiner* — Samuel Berhanu
(74) *Attorney, Agent, or Firm* — Price Heneveld LLP

(57) ABSTRACT

A charger, a data cable, and a charging device, and pertains to the field of communications technologies are provided. The charger includes a type-A female connector and a first processing module. The first processing module includes a PD charging processing unit, a non-PD charging processing unit, a data cable matching unit, and a first switching unit. The type-A female connector includes a first CC pin and a first communication pin. In a case that the data cable matching unit determines that the charger matches a connected data cable based on a matching signal transmitted through the first CC pin, the first switching unit is connected to the first CC pin and the PD charging processing unit. In a case that the charger does not match the connected data cable, the first switching unit is connected to the first CC pin and the data cable matching unit.

19 Claims, 7 Drawing Sheets

(56)     References Cited

U.S. PATENT DOCUMENTS

| | | | |
|---|---|---|---|
| 2017/0256968 A1 | 9/2017 | Yoon et al. | |
| 2017/0336844 A1 | 11/2017 | Koga | |
| 2018/0054074 A1* | 2/2018 | Guo | H02J 7/00 |
| 2018/0219399 A1 | 8/2018 | Balakrishnan et al. | |
| 2020/0099238 A1* | 3/2020 | Wu | H02J 7/0045 |

FOREIGN PATENT DOCUMENTS

| | | | |
|---|---|---|---|
| CN | 108233130 | A | 6/2018 |
| CN | 207732484 | U | 8/2018 |
| CN | 209071779 | U | 7/2019 |
| CN | 110534988 | A | 12/2019 |
| CN | 210129644 | U | 3/2020 |
| CN | 210327098 | U | 4/2020 |
| CN | 111509818 | A | 8/2020 |
| JP | 2015176442 | A | 10/2015 |
| JP | 2017038429 | A | 2/2017 |
| JP | 2017520221 | A | 7/2017 |
| JP | 2018124991 | A | 8/2018 |
| JP | 2020005339 | A | 1/2020 |
| WO | 2016121434 | A1 | 8/2016 |

* cited by examiner charger
1
~

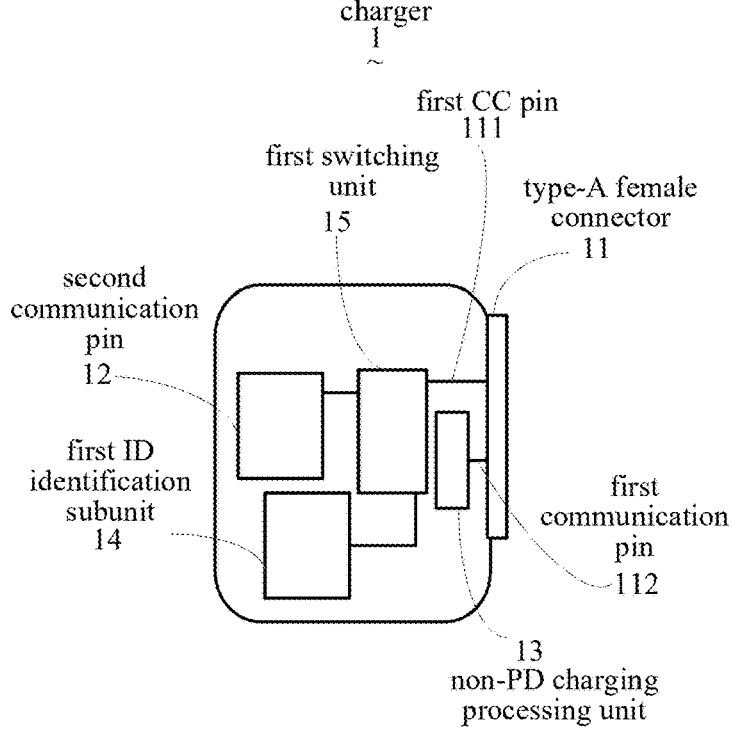

first CC pin
111 first switching
unit
15 type-A female
connector
11 second
communication
pin
12 first ID
identification
subunit
14 first
communication
pin
112

13
non-PD charging
processing unit

FIG. 2 data cable
2
~

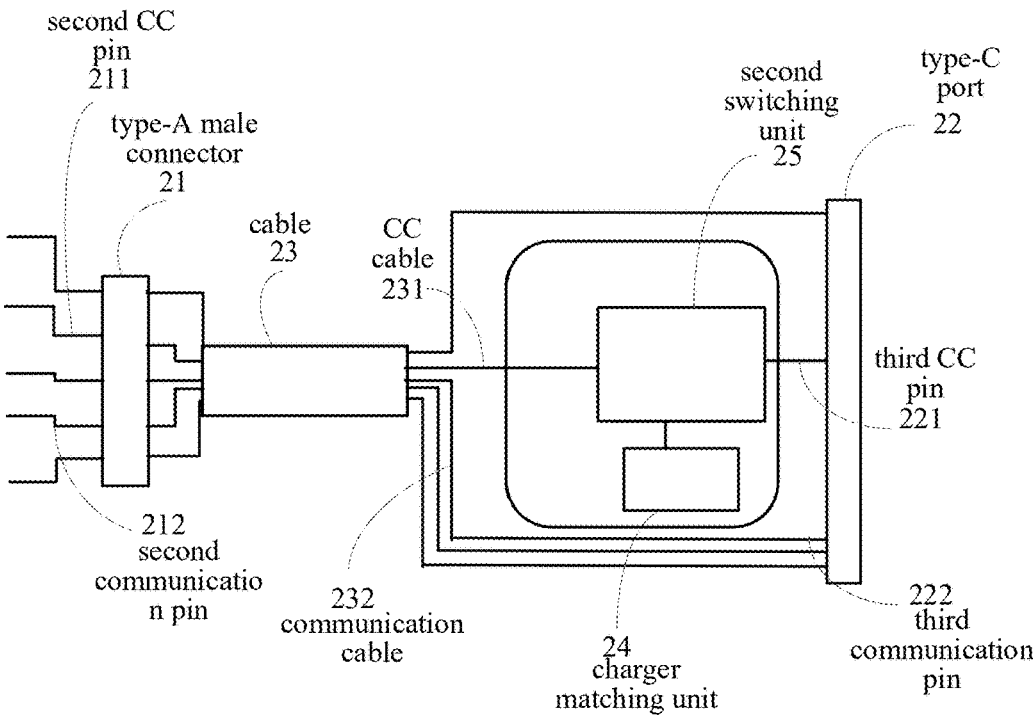

second CC
pin
211 type-A male
connector
21 cable
23

CC
cable
231 second
switching
unit
25 type-C
port
22 third CC
pin
221

212
second
communication
pin 232
communication
cable 24
charger
matching unit 222
third
communication
pin

FIG. 3 type-A female connector
11
~ type-A male connector
21
~

901

In a case that a charger is connected to a power supply, match a data cable connected to the charger with the charger

902

In a case that the charger successfully matches the data cable, drive a first switching unit to connect a first CC pin to a PD charging processing unit, and drive a second switching unit to connect a second CC pin to a third CC pin

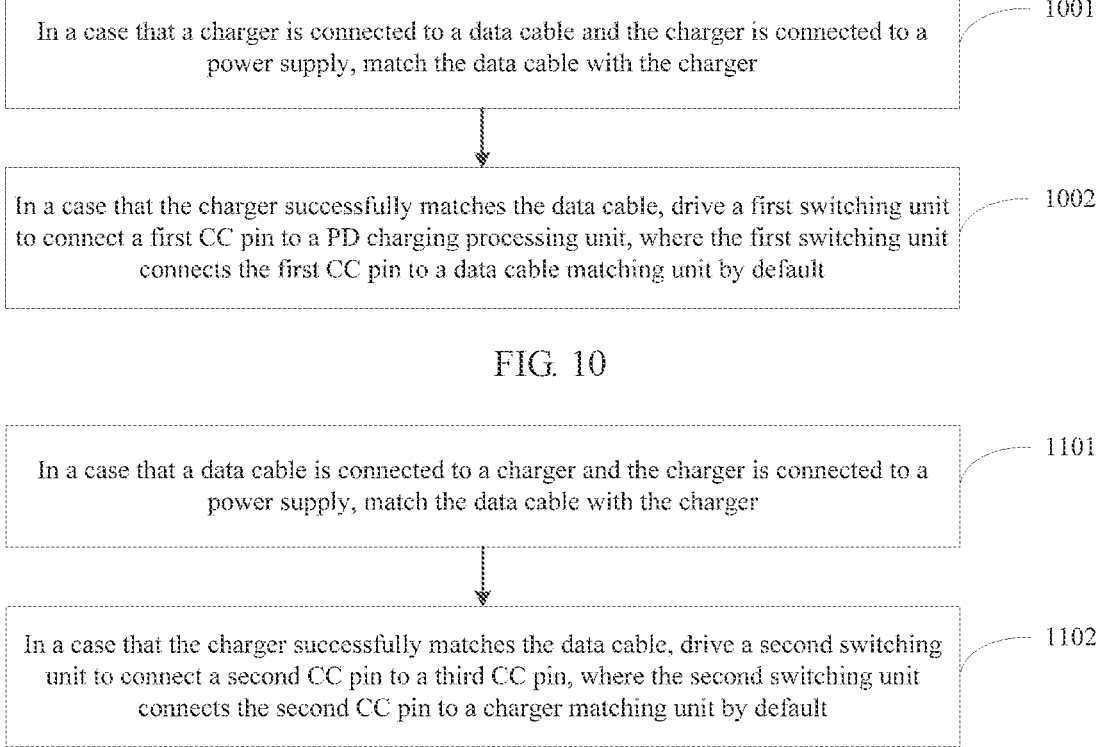

In a case that a charger is connected to a data cable and the charger is connected to a power supply, match the data cable with the charger ⟋— 1001

In a case that the charger successfully matches the data cable, drive a first switching unit to connect a first CC pin to a PD charging processing unit, where the first switching unit connects the first CC pin to a data cable matching unit by default ⟋— 1002

FIG. 10

In a case that a data cable is connected to a charger and the charger is connected to a power supply, match the data cable with the charger ⟋— 1101

In a case that the charger successfully matches the data cable, drive a second switching unit to connect a second CC pin to a third CC pin, where the second switching unit connects the second CC pin to a charger matching unit by default ⟋— 1102

CHARGER, DATA CABLE, AND CHARGING DEVICE

CROSS-REFERENCE TO RELATED APPLICATIONS

This application is a continuation application of International Application No. PCT/CN2021/096694 filed on May 28, 2021, which claims priority to Chinese Patent Application No. 202010479652.3 filed in China on May 29, 2020, which are incorporated herein by reference in their entireties.

TECHNICAL FIELD

This application pertains to the field of communications technologies, and specifically relates to a charger, a data cable, and a charging device.

BACKGROUND

With the development of science and technology, quick charging is increasingly widely used.

In a related technology, a power delivery (PD) protocol is generally used for quick charging. A charger that supports charging of the PD protocol needs to use a configuration channel (CC) signal cable for communication. The charger that supports charging of the PD protocol generally uses a type-C port and has a Type-C to Type-C data cable. A charger that uses a type-A (Type-A or Standard-A) port performs communication by a D+/D− signal cable, and cannot support charging of the PD protocol. However, currently, the most widely used data cable is a data cable with a type-A port, and consequently, a type-A port on a conventional data cable does not match the type-C port on the charger that supports charging of the PD protocol.

SUMMARY

Embodiments of this application are to provide a charger, a data cable, and a charging device.

According to a first aspect, an embodiment of this application provides a charger, including a type-A female connector, a PD charging processing unit, a non-PD charging processing unit, a data cable matching unit, and a first switching unit; where the type-A female connector includes a first CC pin and a first communication pin, the first CC pin is connected to a first end of the first switching unit, a second end of the first switching unit is connected to the PD charging processing unit, a third end of the first switching unit is connected to the data cable matching unit, and the first communication pin is connected to the non-PD charging processing unit; and in a case that the charger is connected to a data cable, if the data cable is a first data cable, the first end of the first switching unit is connected to the second end of the first switching unit, the first end of the first switching unit is disconnected from the third end of the first switching unit, and the charger performs, by the first CC pin, PD charging on a to-be-charged device connected to the first data cable, or performs, by the first communication pin, non-PD charging on a to-be-charged device connected to the first data cable; or in a case that the charger is connected to a data cable, if the data cable is a second data cable, the first end of the first switching unit is connected to the third end of the first switching unit, the first end of the first switching unit is disconnected from the second end of the first switching unit, and the charger performs, by the first communication pin, non-PD charging on a to-be-charged device connected to the second data cable; where when the data cable matching unit determines that the charger matches the data cable based on a matching signal transmitted through the first CC pin, the data cable is the first data cable; and when the data cable matching unit determines that the charger does not match the data cable, the data cable is the second data cable based on the matching signal transmitted through the first CC pin.

According to a second aspect, an embodiment of this application provides a data cable, including a type-A male connector, a type-C port, and a cable connected between the type-A male connector and the type-C port, where a charger matching unit and a second switching unit are disposed on the cable;

the type-A male connector includes a second CC pin and a second communication pin, the cable includes a CC cable and a communication cable, a first end of the CC cable is connected to the second CC pin, the type-C port includes a third CC pin and a third communication pin, and two ends of the communication cable are separately connected to the second communication pin and the third communication pin;

a first end of the second switching unit is connected to a second end of the CC cable, a second end of the second switching unit is connected to the charger matching unit, and a third end of the second switching unit is connected to the third CC pin; and in a case that the data cable is connected to a charger, if the charger is a first charger, the first end of the second switching unit is connected to the third end of the second switching unit, the first end of the second switching unit is disconnected from the second end of the second switching unit, and the first charger and the data cable perform, by the third CC pin, PD charging on a to-be-charged device connected to the data cable, or perform, by the third communication pin, non-PD charging on a to-be-charged device connected to the data cable; or if the charger is a second charger, the first end of the second switching unit is connected to the second end of the second switching unit, the first end of the second switching unit is disconnected from the third end of the second switching unit, and the second charger and the data cable perform, by the third communication pin, non-PD charging on a to-be-charged device connected to the data cable; where when the charging matching unit determines the charger is the first charger based on a matching signal transmitted through the second CC pin that the charger matches the data cable; and when the charger matching unit determines that the charger does not match the data cable based on the matching signal transmitted through the second CC pin, the charger is the second charger.

According to a third aspect, an embodiment of this application provides a charging device, including a charger and a data cable connected to the charger, where the charger is the charger in the first aspect, the data cable is the data cable in the second aspect, the first CC pin is connected to the second CC pin, and the first communication pin is connected to the second communication pin; where in a case that the data cable successfully matches the charger, a first end of the first switching unit is connected to a second end of the first switching unit, the first end of the first switching unit is disconnected from a third end of the first switching unit, a first end of the second switching unit is connected to a third end of the second switching unit, and the first end of the second switching unit is disconnected from a second end of the second switching unit; where in a case that the data cable is connected to a to-be-charged device, if the charger performs PD charging on the to-be-charged device, the charging device performs PD charging on the to-be-charged device by the third CC pin; and if the charger performs non-PD charging on the to-be-charged device, the charger performs non-PD charging on the to-be-charged device by the third communication pin.

According to a fourth aspect, an embodiment of this application provides a charging method, applied to the charger provided in the first aspect, where the method includes:

in a case that the charger is connected to a data cable and the charger is connected to a power supply, matching the data cable with the charger; and in a case that the charger successfully matches the data cable, driving a first switching unit to connect a first CC pin to a PD charging processing unit, where the first switching unit connects the first CC pin to a data cable matching unit by default.

According to a fifth aspect, an embodiment of this application provides a charging method, applied to the data cable provided in the second aspect, where the method includes:

in a case that the data cable is connected to a charger and the charger is connected to a power supply, matching the data cable with the charger; and in a case that the charger successfully matches the data cable, driving a second switching unit to connect a second CC pin to a third CC pin, where the second switching unit connects the second CC pin to a charger matching unit by default.

According to a sixth aspect, an embodiment of this application provides a charging method, applied to the charging device provided in the third aspect, where the method includes:

in a case that a charger is connected to a power supply, matching a data cable connected to the charger with the charger; and in a case that the charger successfully matches the data cable, driving a first switching unit to connect a first CC pin to a PD charging processing unit, and driving a second switching unit to connect a second CC pin to a third CC pin.

According to a seventh aspect, an embodiment of this application provides an electronic device. The electronic device includes a processor, a memory, and a program or an instruction that is stored in the memory and that can run on the processor, and the program or the instruction is executed by the processor to implement the steps of the method according to the third aspect, the steps of the method according to the fourth aspect, or the steps of the method according to the fifth aspect.

According to an eighth aspect, an embodiment of this application provides a readable storage medium. A program or an instruction is stored on the readable storage medium, and the program or the instruction is executed by a processor to implement the steps of the method according to the third aspect, the steps of the method according to the fourth aspect, or the steps of the method according to the fifth aspect.

According to a ninth aspect, an embodiment of this application provides a chip. The chip includes a processor and a communication port, the communication port is coupled to the processor, and the processor is configured to run a program or an instruction to implement the steps of the method according to the third aspect, the steps of the method according to the fourth aspect, or the steps of the method according to the fifth aspect.

According to the charger provided in embodiments of this application, the first CC pin is added to the type-A female connector, and the first CC pin is connected to the data cable matching unit. In this way, in a case that the data cable with the type-A male connector is inserted into the type-A female connector, if a matching signal is obtained on the first CC pin, the matching signal can be transmitted to the data cable matching unit for matching, and when the matching succeeds, the first switching unit connects the first CC pin to the PD charging processing unit, to connect to a PD quick charging channel by the first CC pin, thereby providing a PD quick charging function, so that the charger can support PD protocol charging by the type-A port.

BRIEF DESCRIPTION OF DRAWINGS

FIG. 2 is a circuit diagram of a charger according to an embodiment of this application;

FIG. 3 is a circuit diagram of a data cable according to an embodiment of this application;

FIG. 10 is a flowchart of a second charging method according to an embodiment of this application; and FIG. 11 is a flowchart of a third charging method according to an embodiment of this application.

DESCRIPTION OF EMBODIMENTS

The following clearly and completely describes the technical solutions in the embodiments of this application with reference to the accompanying drawings in the embodiments of this application. Apparently, the described embodiments are some rather than all of the embodiments of this application. Based on the embodiments of this application, all other embodiments obtained by a person of ordinary skill in the art without creative efforts fall within the protection scope of this application.

Terms "first" and "second" in the specification and claims of this application are used to distinguish between similar objects, and are not used to describe a specific order or sequence. It should be understood that data used in this way may be interchangeable in appropriate cases, so that the embodiments of this application can be implemented in a sequence other than those shown or described herein. In addition, in the specification and the claims, "and/or" represents at least one of connected objects, and the character "/" generally represents an "or" relationship between associated objects.

With reference to the accompanying drawings, a charger provided in embodiments of this application is described in detail below by a specific embodiment and an application scenario thereof.

Figure 1:
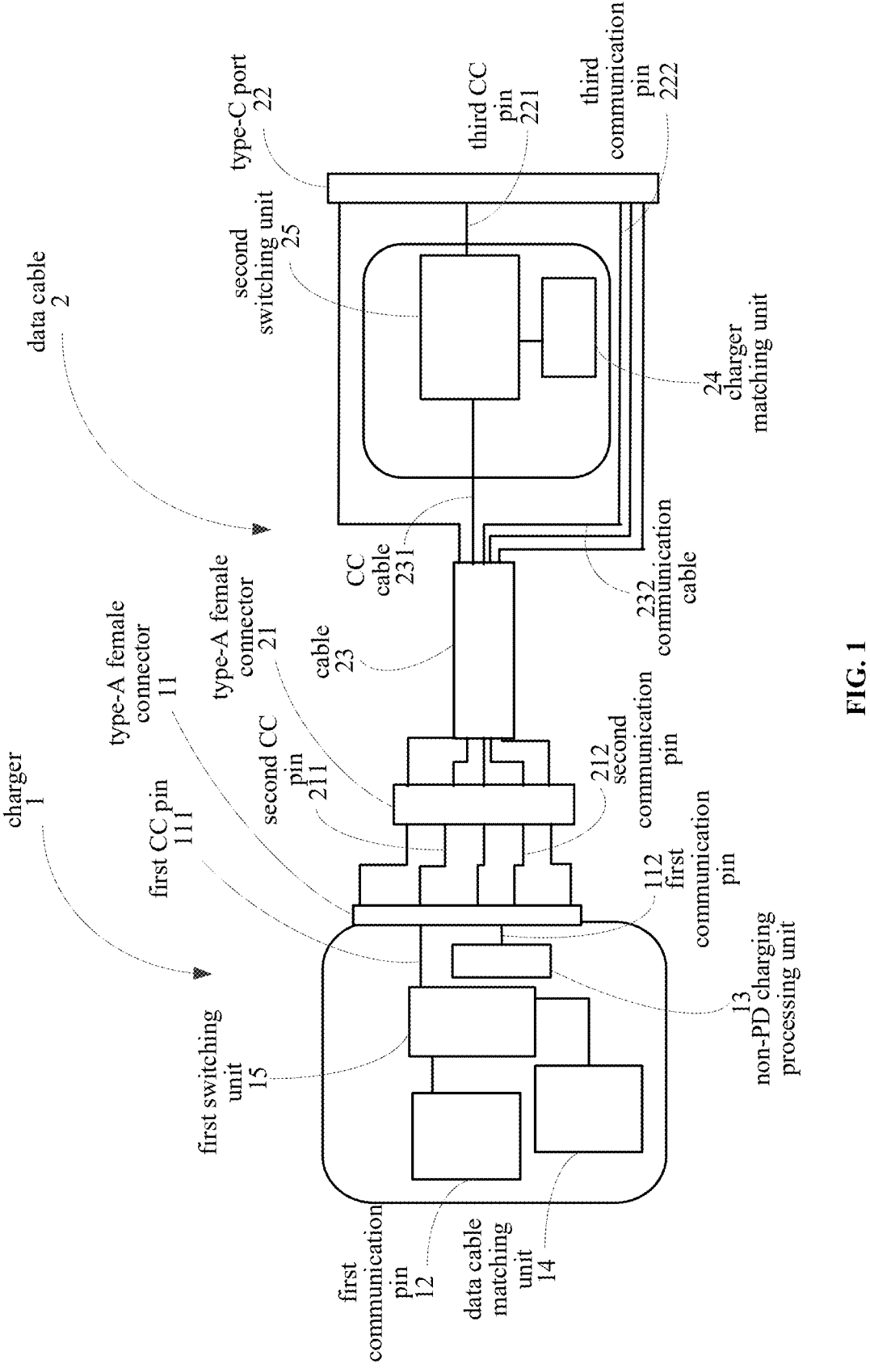
FIG. 1 is a circuit diagram of a charging device according to an embodiment of this application.

Refer to FIG. 1, FIG. 2, and FIG. 3 at the same time. FIG. 1 is a circuit diagram of a charging device according to an embodiment of this application. FIG. 2 is a circuit diagram of a charger according to an embodiment of this application. FIG. 3 is a circuit diagram of a data cable according to an embodiment of this application.

A charger 1 includes a type-A female connector 11, a PD charging processing unit 12, a non-PD charging processing unit 13, a data cable matching unit 14, and a first switching unit 15. Specifically, the type-A female connector 11 includes a first CC pin 111 and a first communication pin 112, the first CC pin 111 is connected to a first end of the first switching unit 15, a second end of the first switching unit 15 is connected to the PD charging processing unit 12, a third end of the first switching unit 15 is connected to the data cable matching unit 14, and the first communication pin 112 is connected to the non-PD charging processing unit 13.

In a case that the charger 1 is connected to a data cable, if the data cable is a first data cable, the first end of the first switching unit 15 is connected to the second end of the first switching unit 15, the first end of the first switching unit 15 is disconnected from the third end of the first switching unit 15, and the charger 1 performs, by the first CC pin 111, PD charging on a to-be-charged device connected to the first data cable, or performs, by the first communication pin 112, non-PD charging on a to-be-charged device connected to the first data cable; or in a case that the charger 1 is connected to a data cable, if the data cable is a second data cable, the first end of the first switching unit 15 is connected to the third end of the first switching unit 15, the first end of the first switching unit 15 is disconnected from the second end of the first switching unit 15, and the charger 1 performs, by the first communication pin 112, non-PD charging on a to-be-charged device connected to the second data cable; where when the data cable matching unit 14 determines that the charger 1 matches the data cable, the data cable is the first data cable based on a matching signal transmitted through the first CC pin 111; and when the data cable matching unit 14 determines that the charger 1 does not match the data cable, the data cable is the second data cable based on the matching signal transmitted through the first CC pin 111.

In specific implementation, the matching signal may be obtained from a data cable connected to the charger 1. In addition, the first data cable may be understood as a data cable that matches the charger 1, and may be specifically a data cable 2 shown in FIG. 1 and FIG. 4.

In an implementation, the matching signal may be an electrical signal of a specific value, for example, a level value, a current value, or a resistance value on the first CC pin 111. When the first CC pin 111 is in contact with a second CC pin 211 on the data cable 2, the value of the electrical signal on the first CC pin 111 changes, so that it can be determined whether the data cable connected to the charger 1 is the first data cable that matches the charger 1 based on the value of the electrical signal on the first CC pin 111.

It should be noted that, in a case that the data cable connected to the charger 1 is a data cable that does not match the charger 1, the first CC pin 111 is not in contact with a CC pin on the unmatched data cable (or the data cable has no CC pin), so that the value of the electrical signal on the first CC pin 111 is 0 or is not equal to an electrical signal value of the first matching signal. In this way, the data cable matching unit 14 can determine that the data cable connected to the charger 1 is a data cable that does not match the charger 1, so that the first end of the first switching unit 15 is connected to the third end of the first switching unit 15.

In another implementation, the first matching signal may be a digital signal. For example, in a case that the charger 1 is connected to a power supply and the first data cable, the data cable matching unit 14 generates a second matching signal, and transmits the second matching signal to a charger matching unit 24 on the data cable 2 by the first CC pin 111 connected to the data cable matching unit 14 and a second CC pin 211 on the data cable 2. The charger matching unit 24 generates a first matching signal in response to the second matching signal, and transmits the first matching signal to the data cable matching unit 14 by the second CC pin 211 and the first CC pin 111. In this case, the data cable matching unit 14 determines, when obtaining the first matching signal, that the data cable connected to the charger 1 is the first data cable that matches the charger 1, to connect the first end of the first switching unit 15 to the second end of the first switching unit 15.

The first matching signal and the second matching signal may be a same digital signal, for example, both are a string "100101" or the like. In this way, when receiving a digital signal that is the same as the first matching signal, the data cable matching unit 14 can determine that the charger 1 matches the first data cable. Alternatively, the first matching signal and the second matching signal may be different digital signals, and a correspondence between the first matching signal and the second matching signal is pre-stored in the data cable matching unit 14 and the charger matching unit 24, so that when receiving a digital signal corresponding to the first matching signal, the data cable matching unit 14 can determine that the charger 1 matches the first data cable.

It should be noted that, in a case that the data cable connected to the charger 1 is a data cable that does not match the charger 1, the unmatched data cable cannot receive the second matching signal transmitted by the first CC pin 111 or feed back the first matching signal. In this way, the data cable matching unit 14 can determine that the data cable connected to the charger 1 is the second data cable that does not match the charger 1, so that the first end of the first switching unit 15 is connected to the third end of the first switching unit 15. In addition, in a default case (for example, the charger 1 is not connected to the power supply, or the charger 1 is not connected to the data cable or is connected to an unmatched data cable), the first end of the first switching unit 15 is connected to the third end of the first switching unit 15.

In specific implementation, the PD charging processing unit 12 includes a CC logic controller and a PD controller, and the CC logic controller and the PD controller are connected. When the PD charging processing unit 12 is connected to the first CC pin 111, the CC logic controller can perform CC protocol communication by the first CC pin 111, and the PD controller performs a PD quick charging function based on CC protocol communication information received by the CC logic controller, to improve charging efficiency for a to-be-charged device.

In addition, a case that the first CC pin 111 obtains the first matching signal may also be understood as follows: In a case that the first CC pin 111 obtains the first matching signal and transmits the first matching signal to the data cable matching unit 14, the data cable matching unit 14 identifies or matches the first matching signal.

In specific application, in a case that the charger 1 is connected to a conventional second data cable, because a second CC pin corresponding to the first CC pin 111 is not disposed in a type-A male connector of the conventional data cable, the first CC pin cannot obtain the first matching signal, and therefore, the first end of the first switching unit 15 in the charger 1 is connected to the third end of the first switching unit 15, that is, the first switching unit is connected to the first CC pin 111 and the data cable matching unit 14, but is not connected to the first CC pin 111 and the PD charging processing unit 12. In this case, the charger 1 does not provide a PD charging channel, and can only perform non-PD charging by the non-PD charging processing unit 13.

Figure 4:
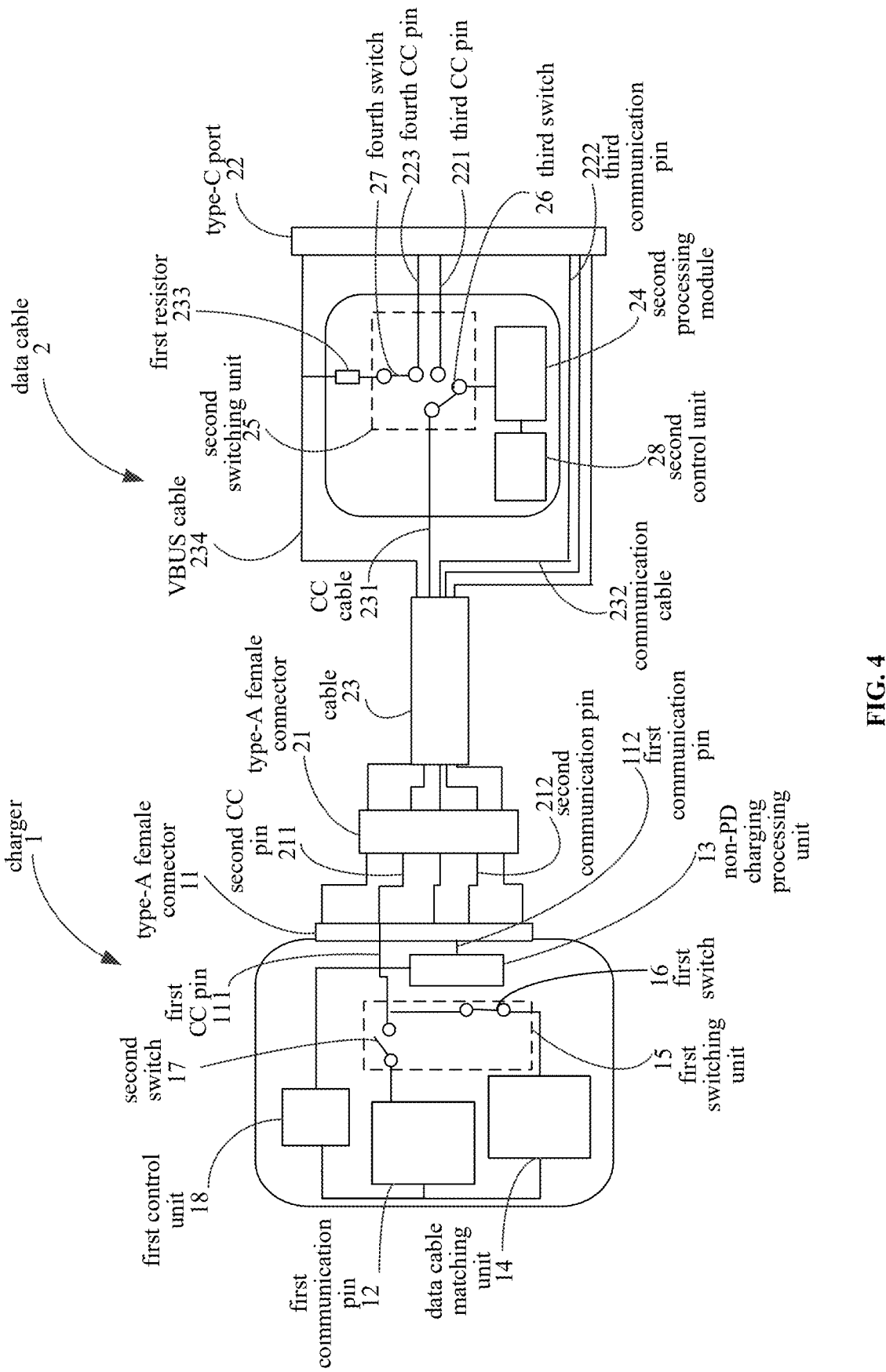
FIG. 4 is a circuit diagram of another charging device according to an embodiment of this application.

In specific implementation, in a case that it is detected that the data cable 2 shown in FIG. 4 is connected to the power supply, the charger matching unit 24 in the data cable 2 first sends the first matching signal to the charger 1, and the data cable matching unit 14 in the charger 1 feeds back the second matching signal to the charger matching unit 24 in response to the first matching signal. This is not specifically limited herein.

In addition, in specific implementation, in a case that the first end of the first switching unit 15 is connected to the second end of the first switching unit 15, the first end of the first switching unit 15 is disconnected from the third end of the first switching unit 15. In a case that the first end of the first switching unit 15 is connected to the third end of the first switching unit 15, the first end of the first switching unit 15 is disconnected from the second end of the first switching unit 15.

Figure 5:
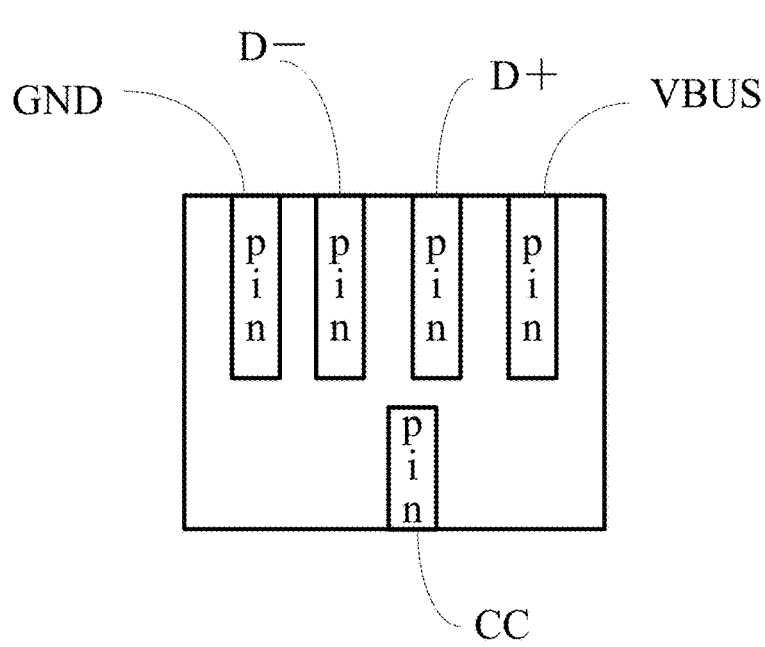
FIG. 5 is a schematic diagram of a pin of a type-A female connector in a charger according to an embodiment of this application.

It should be noted that in specific implementation, the charger 1 further includes a charging module. A power bus (VBUS) pin and a ground (GND) pin are further disposed in the type-A female connector 11. For example, as shown in FIG. 5, a GND pin, a D+ pin, a D− pin, and a VBUS pin are disposed on a first side of the type-A female connector 11, and a first CC pin is disposed on a second side of the type-A female connector 11. The first side and the second side of the type-A female connector 11 are two opposite sides.

Certainly, distribution locations of pins in the type-A female connector 11 may be further exchanged or changed. This is not specifically limited herein. In addition, structures and working principles of the charging module, the VBUS pin, and the GND pin are the same as those of a charging module, a VBUS pin, and a GND pin in a conventional technology, and are not specifically described herein.

In this implementation, the first CC pin is added to the type-A female connector, and the first CC pin is connected to the data cable matching unit. In this way, in a case that the data cable with the type-A male connector is inserted into the type-A female connector, if a matching signal is obtained on the first CC pin, the matching signal can be transmitted to the data cable matching unit for matching, and when the matching succeeds, the first switching unit connects the first CC pin to the PD charging processing unit, to connect to a PD quick charging channel by the first CC pin, thereby providing a PD quick charging function, so that the charger can support PD protocol charging by the type-A port.

In an optional implementation, as shown in FIG. 4, the first switching unit 15 includes a first switch 16 and a second switch 17.

A first end of the first switch 16 is connected to the first CC pin 111, and a second end of the first switch 16 is connected to the data cable matching unit 14.

A first end of the second switch 17 is connected to the first CC pin 111, and a second end of the second switch 17 is connected to the PD charging processing unit 12.

In a case that the charger 1 is connected to the first data cable, the second switch 17 is closed, and the first switch 16 is opened. In a case that the charger 1 is connected to the second data cable, the second switch 17 is opened, and the first switch 16 is closed.

In specific implementation, the first switch 16 and the second switch 17 may be switches controlled by an analog signal, for example, a transistor or a metal-oxide semiconductor (MOS) transistor. When an electrical signal value on the first CC pin 111 changes, the first switch 16 and the second switch 17 are connected or disconnected based on the electrical signal value on the first CC pin 111. In addition, the first switch 16 and the second switch 17 may be switches controlled by a digital signal. For example, as shown in FIG. 4, the PD charging processing unit 12 further includes a first control unit 18, and the first control unit 18 is directly or indirectly connected to the first switch 16 and the second switch 17, so that the first switch 16 and the second switch 17 are connected or disconnected based on a control signal sent by the first control unit 18. It should be noted that on/off states of the first switch 16 and the second switch 17 are different. To be specific, when the first switch 16 is connected, the second switch 17 is disconnected, and when the first switch 16 is disconnected, the second switch 17 is connected.

Certainly, in specific implementation, after the charger 1 is connected to the first data cable, the on/off states of the first switch 16 and the second switch 17 may also be adjusted based on the control signal of the first control unit 18. This is not specifically limited herein.

In this implementation, the first switching unit 15 is set to two switches, so that a structure and a control process of the first switching unit 15 can be simplified.

In an optional implementation, as shown in FIG. 4 and FIG. 5, the non-PD charging processing unit 13 is a charging processing unit of a D+/D− communication protocol, and the first communication pin 112 includes a D+ pin and a D− pin.

In this implementation, the non-PD charging processing unit 13 can implement a communication process in a non-PD charging protocol by the D+ pin and the D− pin, such as data minus (DM) and data positive (DP) charging communication.

It should be noted that a specific principle and a process of the foregoing DM and DP charging communication is the same as a specific principle and process of DM and DP charging communication in the conventional technology, and details are not described herein again.

In addition, in a case that the first switching unit 15 is connected or is not connected to the first CC pin 111 and the PD charging processing unit 12, the D+ pin and the D− pin are always connected to the non-PD charging processing unit 13, thereby continuously providing a non-PD charging channel.

In this implementation, in a case that the first CC pin 111 is not connected to the PD charging processing unit 12, a non-PD charging function can still be provided, and in a case that the first CC pin 111 is connected to the PD charging processing unit 12, both a PD charging channel and a non-PD charging channel are connected. In this way, the to-be-charged device can independently choose to PD charging or non-PD charging.

In an optional implementation, as shown in FIG. 4, the data cable matching unit 14 may be a first ID identification subunit 14.

In addition, the charger 1 may further include a first control unit 18, and the first control unit 18 is separately connected to the data cable matching unit 14 and the first switching unit 15.

The first control unit 18 is configured to: in a case that the data cable matching unit 14 obtains a first matching signal by the first CC pin 111, drive the first end of the first switching unit 15 to connect to the second end of the first switching unit 15, and drive the first end of the first switching unit 15 to disconnect from the third end of the first switching unit 15, where the first matching signal is sent by the first data cable connected to the charger 1.

In specific implementation, the first control unit 18 may be any logical control unit, such as a microcontroller unit (MCU). In addition, as shown in FIG. 4, the logical control unit 15 may be further connected to the PD charging processing unit 12 and the non-PD charging processing unit 13, to control the PD charging processing unit 12 to perform PD charging logic processing, or control the non-PD charging processing unit 13 to perform non-PD charging logic processing.

In addition, the ID identification subunit 14 is configured to identify the data cable connected to the charger 1 by specifically identifying a digital signal or an analog signal obtained on the first CC pin 111, to determine whether the data cable is a data cable that matches the charger 1.

In this implementation, the ID identification subunit 14 identifies the data cable connected to the charger 1, to determine whether the data cable is a data cable that matches the charger 1, and transmits a matching result to the first control unit 18, to provide a basis for control logic of the first control unit 18, so that the first control unit 18 controls, in a case that the charger 1 matches the data cable, the first end of the first switching unit 15 to connect to the second end of the first switching unit 15, and controls, in a case that the charger 1 does not match the data cable, the first end of the first switching unit 15 to connect to the third end of the first switching unit 15.

Figure 7:
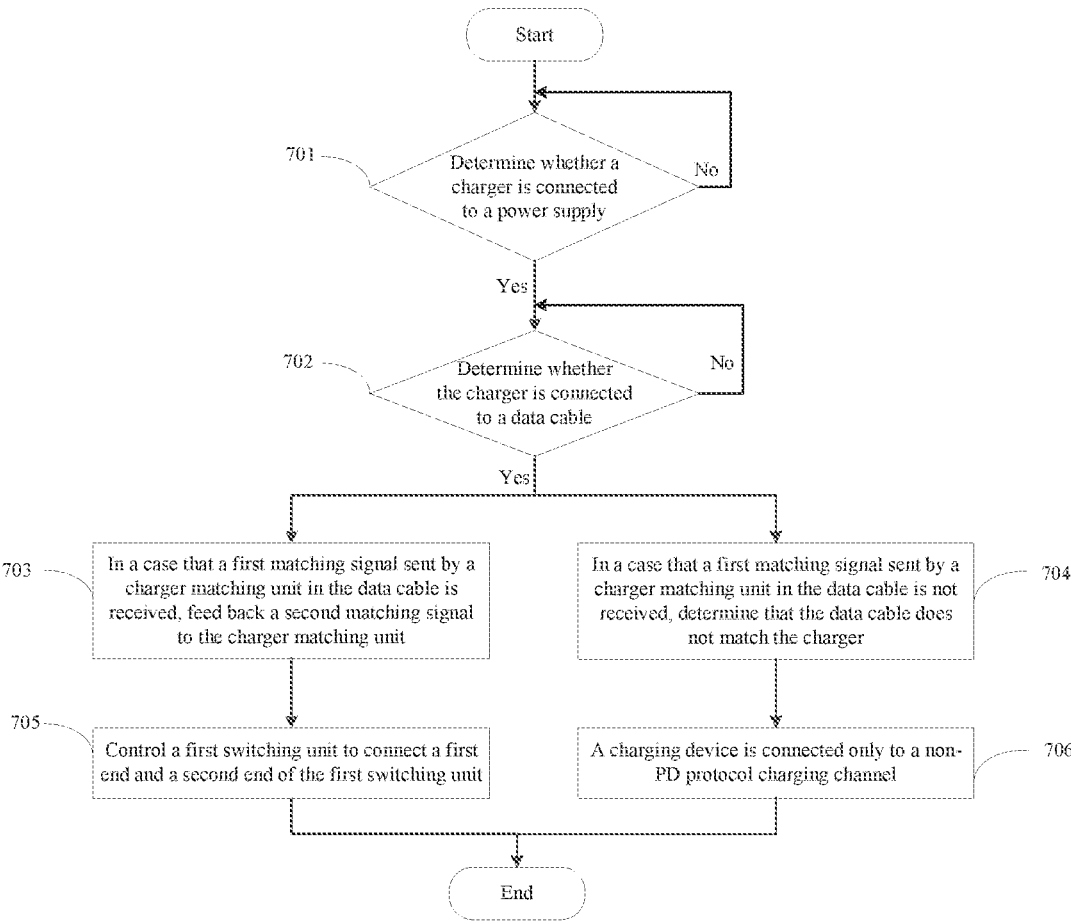
FIG. 7 is a diagram of a working procedure of a charger according to an embodiment of this application.

As shown in FIG. 7, a specific working procedure of a charging device including the charger 1 in the embodiment shown in FIG. 4 is described by an example. The charging device may specifically perform the following steps:

Step 701: Determine whether the charger is connected to a power supply.

Step 702 is performed in a case that a determining result of this step is "yes"; otherwise, this step may be continuously and repeatedly performed.

Step 702: Determine whether the charger is connected to a data cable.

Step 703 or step 704 is performed in a case that a determining result of this step is "yes"; otherwise, this step may be continuously and repeatedly performed.

Specifically, in a case that the data cable connected to the charger matches the charger, step 703 is performed, and in a case that the data cable connected to the charger does not match the charger, step 704 is performed.

Step 703: In a case that a first matching signal sent by a charger matching unit in the data cable is received, feed back a second matching signal to the charger matching unit.

Step 705 is performed in a case that the second matching signal is successfully fed back.

Step 705: Control a first switching unit to connect a first end and a second end of the first switching unit.

It should be noted that, the first switching unit connects the first end and the third end of the first switching unit by default.

In addition, after step 705, a non-PD protocol charging channel in the charger is always connected, and a to-be-charged device may choose either of PD quick charging and normal charging based on a configuration of the to-be-charged device.

Step 704: In a case that a first matching signal sent by a charger matching unit in the data cable is not received, determine that the data cable does not match the charger.

Step 706: The charging device is connected only to a non-PD protocol charging channel.

Refer to FIG. 1 and FIG. 3. An embodiment of this application further provides a data cable. As shown in FIG. 3, the data cable 2 includes a type-A male connector 21, a type-C port 22, and a cable 23 connected between the type-A male connector 21 and the type-C port 22, and a charger matching unit 24 and a second switching unit 25 are disposed on the cable 23.

Specifically, the type-A male connector 21 includes a second CC pin 211 and a second communication pin 212. The cable 23 includes a CC cable 231 and a communication cable 232, and a first end of the CC cable 231 is connected to the second CC pin 211. The type-C port 22 includes a third CC pin 221 and a third communication pin 222. Two ends of the communication cable 232 are separately connected to the second communication pin 212 and the third communication pin 222. A first end of the second switching unit 25 is connected to a second end of the CC cable 231, a second end of the second switching unit 25 is connected to the charger matching unit 24, and a third end of the second switching unit 25 is connected to the third CC pin 221.

In a case that the data cable 2 is connected to a charger, if the charger is a first charger, the first end of the second switching unit 25 is connected to the third end of the second switching unit 25, the first end of the second switching unit 25 is disconnected from the second end of the second switching unit 25, and the first charger and the data cable 2 perform, by the third CC pin 221, PD charging on a to-be-charged device connected to the data cable 2, or perform, by the third communication pin 222, non-PD charging on a to-be-charged device connected to the data cable 2; or if the charger is a second charger, the first end of the second switching unit 25 is connected to the second end of the second switching unit 25, the first end of the second switching unit 25 is disconnected from the third end of the second switching unit 25, and the second charger and the data cable 2 perform, by the third communication pin 222, non-PD charging on a to-be-charged device connected to the data cable 2.

When the charging matching unit 24 determines that the charger matches the data cable 2, the charger is the first charger based on a matching signal transmitted through the second CC pin 211; and when the charger matching unit 24 determines that the charger does not match the data cable 2, the charger is the second charger based on the matching signal transmitted through the second CC pin 211.

In specific implementation, the matching signal is obtained from the first charger that matches the data cable 2. In addition, the first charger may be understood as a charger that matches the data cable 2, and may be specifically the charger 1 shown in FIG. 1 and FIG. 4.

In a case that the data cable 2 in this embodiment of this application is connected to the charger 1 shown in FIG. 1, FIG. 2, or FIG. 4, a PD protocol charging channel and a non-PD protocol charging channel can be provided, to perform PD quick charging on a to-be-charged device that supports a PD quick charging function, and perform non-PD protocol charging on a to-be-charged device that does not support the PD quick charging function. In addition, in a case that the data cable 2 is connected to another charger that has only a conventional type-A female connector (a first CC pin is not disposed), only the non-PD protocol charging channel is provided, so that non-PD protocol charging is performed on a to-be-charged device.

In an optional implementation, the type-C port 22 further includes a fourth CC pin 223. A first resistor 233 is further disposed on the cable 23. A first end of the first resistor 233 is connected to a VBUS cable 234 in the cable 23. The second switching unit 25 further includes a fourth end and a fifth end. The fourth end of the second switching unit 25 is connected to a second end of the first resistor 233, and the fifth end of the second switching unit 25 is connected to the fourth CC pin 223.

In a case that the data cable 2 is connected to the first charger, the fourth end of the second switching unit 25 is disconnected from the fifth end of the second switching unit 25; and in a case that the data cable 2 is connected to the second charger, the fourth end of the second switching unit 25 is connected to the fifth end of the second switching unit 25.

In addition, in a default case (for example, the data cable 2 is not connected to a charger, a charger connected to the data cable 2 is not connected to a power supply, or the data cable 2 is connected to an unmatched charger), the first end of the second switching unit 25 is connected to the second end of the second switching unit 25, and the fourth end of the second switching unit 25 is connected to the fifth end of the second switching unit 25. In this case, the first resistor 233 is used as a pull-up resistor to pull up the fourth CC pin 223 to connect to the VBUS cable 234. In this way, when the data cable 2 is connected to the power supply, the fourth CC pin 223 can connect the VBUS cable 234 to a CC pin on the to-be-charged device, to support a non-PD charging function.

In this implementation, in a case that the data cable 2 is connected to the first charger, a second matching signal can be obtained by the second CC pin 211. The second switching unit 25 disconnects the fourth end from the fifth end based on the second matching signal, to disconnect a connection relationship between the fourth CC pin 223 and the VBUS cable 234. Instead, the third CC pin 221 is connected to the CC cable 231, to perform CC protocol communication by the third CC pin 221 and the CC cable 231, so as to support a PD quick charging function.

In an optional implementation, the second switching unit 25 includes a third switch 26 and a fourth switch 27.

A first end of the third switch 26 is connected to a second end of the CC cable 231, a second end of the third switch 26 is connected to the charger matching unit 24, and a third end of the third switch 26 is connected to the third CC pin 221.

A first end of the fourth switch 27 is connected to the second end of the first resistor 233, and a second end of the fourth switch 27 is connected to the fourth CC pin 223.

In a case that the data cable 2 is connected to the first charger, the second CC pin 211 can obtain the second matching signal, the first end of the third switch 26 is connected to the third end of the third switch 26, the first end of the third switch 26 is disconnected from the second end of the third switch 26, and the fourth switch 27 is opened. In a case that the data cable 2 is connected to the second charger, the second CC pin 211 cannot obtain the second matching signal, the first end of the third switch 26 is connected to the second end of the third switch 26, the first end of the third switch 26 is disconnected from the third end of the third switch 26, and the fourth switch 27 is closed.

In this implementation, the third switch 26 may be a switch controlled by an analog signal, for example, a metal oxide semiconductor (MOS), and certainly, may also be a switch controlled by a digital signal, for example, a single-pole double-throw switch. Correspondingly, the fourth switch 27 may be a switch controlled by an analog signal or a switch controlled by a digital signal. In addition, as shown in FIG. 4, in a case that the third switch 26 and the fourth switch 27 are switches controlled by a digital signal, a second control unit 28 is further disposed in the second processing module 24, to send a corresponding digital control signal by the second control unit 28, so as to adjust on/off states of the third switch 26 and the fourth switch 27. A working principle of the second control unit 28 is the same as a working principle of the first control unit 18 for controlling the first switch 16 and the second switch 17, and details are not described herein again.

It should be noted that, after the data cable 2 is connected to the first charger, the on/off states of the third switch 26 and the fourth switch 27 may also be adjusted based on the control signal of the second control unit 28. This is not specifically limited herein.

In this implementation, the second switching unit 25 is set to the third switch 26 and the fourth switch 27, so that a structure and a control principle of the second switching unit 25 can be simplified.

In an optional implementation, as shown in FIG. 4, the charger matching unit is a second ID identification subunit 24.

In addition, the second control unit 28 is further disposed in the cable 23, and the second control unit 28 is separately connected to the charger matching unit 24 and the second switching unit 25.

The second control unit 28 is configured to: in a case that the charger matching unit 24 obtains a second matching signal transmitted through the second CC pin 211, drive the first end of the second switching unit 25 to connect to the third end of the second switching unit 25, and drive the first end of the second switching unit 25 to disconnect from the second end of the second switching unit 25. The second control unit 28 is further configured to: in a case that the charger matching unit 24 does not obtain the second matching signal transmitted through the second CC pin 211, drive the first end of the second switching unit 25 to connect to the second end of the second switching unit 25, and drive the first end of the second switching unit 25 to disconnect from the third end of the second switching unit 25. The second matching signal is sent by the first charger connected to the data cable 2.

In a specific implementation, in a case that the data cable 2 is connected to an unmatched second charger, the second CC pin 211 on the data cable 2 is not connected to the corresponding first CC pin, so that a data signal or a corresponding analog signal cannot be obtained. In this way, a PD charging protocol channel is disconnected, and only charging of a non-PD protocol can be implemented.

In this way, in a case that the second ID identification subunit 24 obtains a data signal or a corresponding analog signal from the second CC pin 211, it is determined that the data cable 2 is connected to the matched first charger, to connect to the PD charging protocol channel, so as to provide both the PD charging protocol channel and the non-PD charging protocol channel. In application, a priority relationship between PD charging and non-PD charging may be set, and a to-be-charged device is preferably charged in a high-priority charging manner. When the high-priority charging manner is not available to the to-be-charged device, the to-be-charged device may be charged in a low-priority charging manner. Certainly, in specific implementation, the to-be-charged device may alternatively be charged in one of PD charging and non-PD charging based on information exchange between the to-be-charged device and the charger.

In this implementation, the second ID identification subunit 24 is connected to the second CC pin 211, so that in a case that the second CC pin 211 is connected to the first CC pin 111, CC protocol communication information can be obtained by the CC path, and feedback is provided for the second CC pin 211. For example, the CC path is used to feed back the first matching information to the first ID identification subunit 14 shown in FIG. 4.

In specific implementation, in a case that it is detected that the data cable 2 is connected to the power supply, the charger matching unit 24 in the data cable 2 first sends the first matching signal to the charger 1, and the data cable matching unit 14 in the charger 1 feeds back the second matching signal to the charger matching unit 24 in response to the first matching signal. This is not specifically limited herein.

Figure 6:
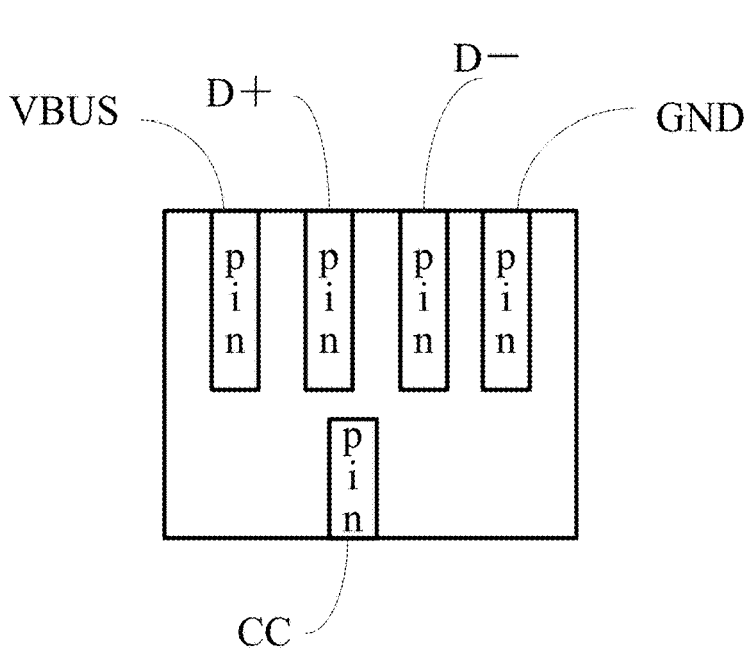
FIG. 6 is a schematic diagram of a pin of a type-A male connector in a data cable according to an embodiment of this application.

In an optional implementation, as shown in FIG. 6, the second communication pin 212 includes a second D+ pin and a second D− pin, the third communication pin 222 includes a third D+ pin and a third D− pin, the communication cable 232 includes a D+ cable and a D− cable, the second D+ pin and the third D+ pin are separately connected to two ends of the D+ cable, and the second D− pin and the third D− pin are separately connected to two ends of the D− cable.

In a case that the data cable 2 is inserted into the charger, at least one of the second D+ pin and the second D− pin is connected to a non-PD charging processing unit in the charger, and the non-PD charging processing unit is a charging processing unit of a D+/D− communication protocol.

It should be noted that in actual application, a structure of the type-A male connector 21 and distribution locations of the pins correspond to the structure of the type-A female connector 11 and the distribution locations of the pins shown in FIG. 1, FIG. 2, FIG. 4, and FIG. 5. Details are not described herein again. Correspondingly, the type-A male connector 21 may further include a VBUS pin, a GND pin, a D+ pin, and a D− pin, the cable 23 also correspondingly includes a VBUS pin, a GND cable, a D+ cable, and a D− cable, the type-C port 22 also correspondingly includes a VBUS pin, a GND pin, a D+ pin, and a D− pin, two ends of the VBUS cable are separately connected to the VBUS pin in the type-A male connector 21 and the VBUS pin in the type-C port 22, two ends of the GND cable are separately connected to the GND pin in the type-A male connector 21 and the GND pin in the type-C port 22, two ends of the D+ cable are separately connected to the D+ pin in the type-A male connector 21 and the D+ pin in the type-C port 22, and two ends of the D− cable are separately connected to the D− pin in the type-A male connector 21 and the D− pin in the type-C port 22.

For example, as shown in FIG. 6, FIG. 6 is a distributed location diagram of each pin in the type-A male connector 21. A GND pin, a D+ pin, a D− pin, and a VBUS pin are disposed on a first side of the type-A male connector 21, and a first CC pin is disposed on a second side of the type-A male connector 21. A first side of the type-A female connector 11 is opposite to a second side. In a case that the type-A male connector 21 is inserted into the type-A female connector 11 shown in FIG. 5, the pins in the type-A male connector 21 are connected to the pin in the type-A female connector 11 in a one-to-one correspondence. A specific connection relationship is shown in the following Table 1:

TABLE 1

| Type-C port cable | Standard-A male connector |  |
| --- | --- | --- |
| GND pin | GND cable | GND pin |
| VBUS pin | VBUS cable | VBUS pin |
| CC1 pin | CC1 cable | CC pin |
| CC2 pin |  |  |
| D+ pin | D+ cable | D+ pin |
| D− pin | D− cable | D− pin |

Figures 8, 9:
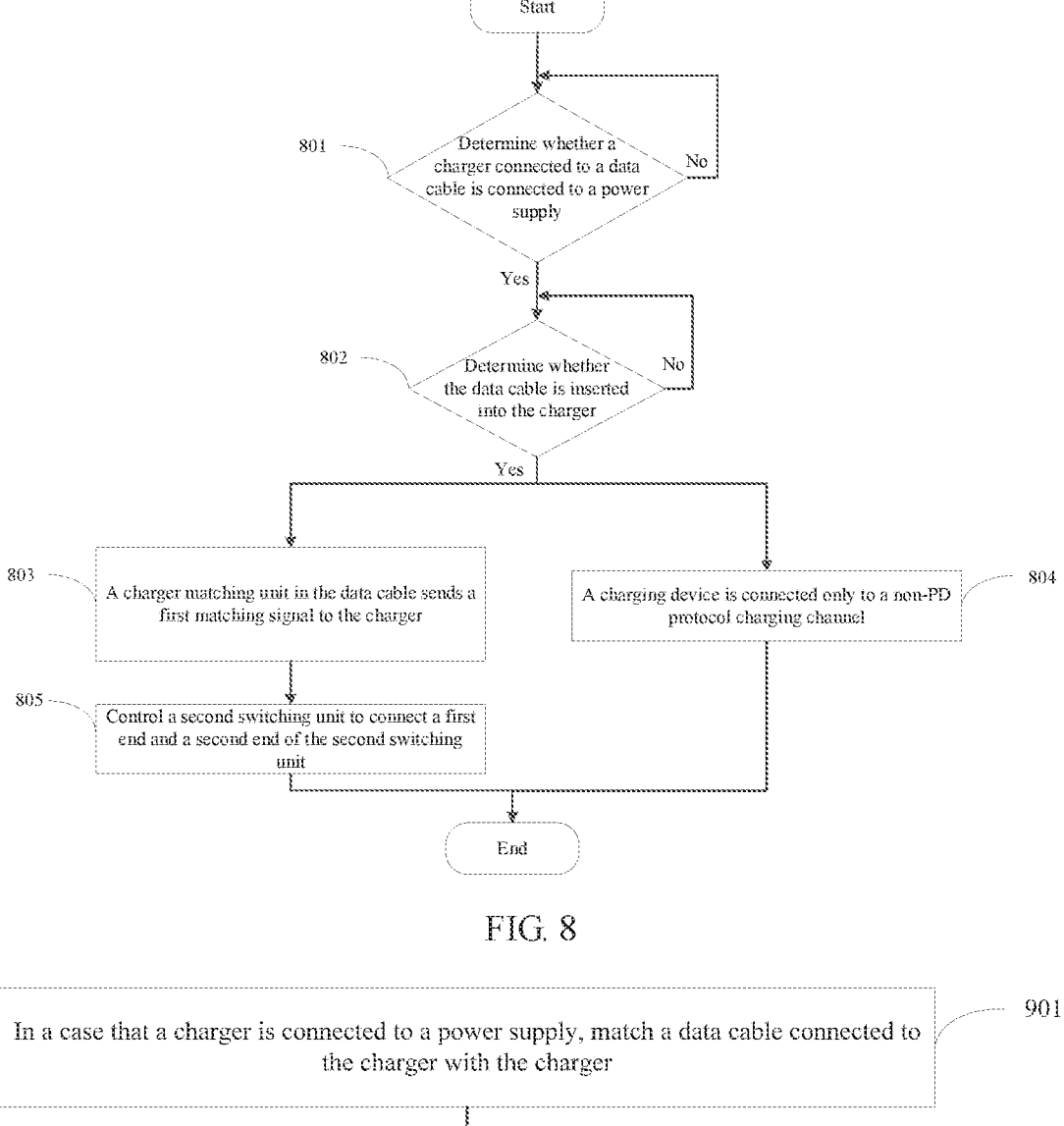
FIG. 8 is a diagram of a working procedure of a data cable according to an embodiment of this application.
FIG. 9 is a flowchart of a first charging method according to an embodiment of this application.

As shown in FIG. 8, a specific working procedure when a data cable is connected to an unmatched charger is described as an example below. The data device may specifically perform the following steps:

Step 801: Determine whether a charger connected to a data cable is connected to a power supply.

Step 802 is performed in a case that a determining result of this step is "yes"; otherwise, this step may be continuously and repeatedly performed.

Step 802: Determine whether the data cable is inserted into the charger.

Step 803 or step 804 is performed in a case that a determining result of this step is "yes"; otherwise, this step may be continuously and repeatedly performed.

Specifically, in a case that the data cable connected to the charger is the data cable 2 in the embodiment shown in FIG. 4, step 803 is performed, and in a case that the data cable connected to the charger is a conventional data cable, step 804 is performed.

Step 803: A charger matching unit in the data cable sends a first matching signal to the charger.

If the charger connected to the data cable is a conventional charger that does not match the data cable 2, the charger does not feed back a second matching signal to the data cable, to perform step 805.

Step 805: Control a second switching unit to connect a first end and a second end of the second switching unit.

It should be noted that, in a default case, the second switching unit connects the first end and the second end of the second switching unit. Step 805 may maintain a default switching state of the second switching unit.

Step 804: The charging device is connected only to a non-PD protocol charging channel.

It should be noted that, after step 804 or step 805, the charger is connected to a non-PD protocol charging channel in the data cable, a PD protocol charging channel in the data cable is not connected, and a to-be-charged device may be normally charged by the charging device.

Referring to FIG. 1 and FIG. 4, FIG. 1 and FIG. 4 are structural diagrams of a charging device according to an embodiment of this application. The charging device includes the charger 1 and the data cable 2 that are provided in the foregoing embodiments. The first CC pin 111 is connected to the second CC pin 211, and the first communication pin 112 is connected to the second communication pin 212.

In a case that the data cable 2 successfully matches the charger 1, a first end of the first switching unit 15 is connected to a second end of the first switching unit 15, the first end of the first switching unit 15 is disconnected from a third end of the first switching unit 15, a first end of the second switching unit 25 is connected to a third end of the second switching unit 25, and the first end of the second switching unit 25 is disconnected from a second end of the second switching unit 25.

In a case that the data cable 2 is connected to a to-be-charged device, the charging device performs PD charging on the to-be-charged device by the third CC pin 221 or performs non-PD charging on the to-be-charged device by the third communication pin 222.

In specific implementation, in a case that the charger 1 is connected to a power supply, a first target unit is configured to generate a first matching signal and transmit the first matching signal to a second target unit.

The second target unit sends a second matching signal to the first target unit.

In a case that the first target unit receives the second matching signal, the first target unit determines that the first target unit matches the second target unit, and in a case that the second target unit receives the first matching signal, the second target unit determines that the first target unit matches the second target unit, where the first target unit is one of the data cable matching unit 14 or the charger matching unit 24, and the second target unit is the other in the data cable matching unit 14 and the charger matching unit 24.

For example, in a case that the first target unit is the data cable matching unit 14, and the second target unit is the charger matching unit 24, when the charger 1 is connected to the power supply, the data cable 2 and the charger 1 may perform the following matching process:

The data cable matching unit 14 generates a second matching signal, and transmits the second matching signal to the charger matching unit 24 by the first CC pin 111, the CC cable 231, and the second CC pin 211.

When receiving the second matching signal, the charger matching unit 24 determines that the data cable 2 matches the charger 1, and the charger matching unit 24 sends the first matching signal to the data cable matching unit 14 in response to the second matching signal by the second CC pin 211, the CC cable 231, and the first CC pin 111.

When receiving the first matching signal, the data cable matching unit 14 determines that the data cable 2 matches the charger 1.

In specific implementation, in a case that it is detected that the data cable 2 is connected to the power supply, the charger matching unit 24 in the data cable 2 first sends the first matching signal to the charger 1, and the data cable matching unit 14 in the charger 1 feeds back the second matching signal to the charger matching unit 24 in response to the first matching signal. This is not specifically limited herein.

It should be noted that, in this implementation, a specific working process of the foregoing charging device is corresponding to a working process of the charger 1 and the data cable 2 in the foregoing embodiment, and details are not described herein again.

FIG. 9 is a flowchart of a first charging method according to an embodiment of the present invention. The charging method is applied to a charging device that includes the charger 1 and the data cable 2 provided in the embodiments of this application, and the charging device may specifically perform the following steps:

Step 901: In a case that the charger is connected to a power supply, match a data cable connected to the charger with the charger.

Step 902: In a case that the charger successfully matches the data cable, drive a first switching unit to connect a first CC pin to a PD charging processing unit, and drive a second switching unit to connect a second CC pin to a third CC pin.

In specific implementation, in a case that the power supply is detected on a VBUS cable, it may be determined that the charger is connected to the power supply. In addition, the matching the data cable connected to the charger with the charger may be: detecting whether a data cable matching unit in the charger obtains a first matching signal from the first CC pin, and detecting whether a charger matching unit in the data cable obtains a second matching signal from the second CC pin, a CC cable, and the third CC pin. The foregoing matching process is the same as the matching process in the embodiments of the charger, the data cable, and the charging device provided in the embodiments of this application, and details are not described herein again.

Optionally, in a case that the charger is connected to the power supply, the matching the data cable connected to the charger with the charger includes:

in a case that the charger is connected to the power supply, the data cable matching unit generates a second matching signal, and transmits the second matching signal to the charger matching unit;

the charger matching unit transmits a first matching signal to the data cable matching unit in response to the second matching signal; and in a case that the data cable matching unit receives the first matching signal, determining that the charger matches the data cable.

In specific implementation, a sequence of steps in the foregoing matching process may be changed. For example, the charger matching unit 24 in the data cable 2 may first send the first matching signal to the charger 1, and then the data cable matching unit 14 in the charger 1 feeds back the second matching signal to the charger matching unit 24 in response to the first matching signal. This is not specifically limited herein.

In the charging device provided in this embodiment of this application, a CC pin is added to a type-A port, to support a PD charging protocol by the CC pin. Therefore, after the charging device is connected to the power supply, both a PD quick charging function and a non-PD normal charging function can be provided for the to-be-charged device. This has a same beneficial effect as the charging device provided in this embodiment of this application, and details are not described herein again.

FIG. 10 is a flowchart of a second charging method according to an embodiment of this application. The charging method is applied to the charger provided in the embodiments of this application. As shown in FIG. 10, the charging method may specifically include the following steps:

Step 1001: In a case that the charger is connected to a data cable and the charger is connected to a power supply, match the data cable with the charger.

Step 1002: In a case that the charger successfully matches the data cable, drive a first switching unit to connect a first CC pin to a PD charging processing unit, where the first switching unit connects the first CC pin to a data cable matching unit by default.

The case that the charger successfully matches the data cable may be understood as a case that the data cable is the data cable 2 provided in the embodiments of this application.

The second charging method provided in this embodiment of this application can implement each process of the charger provided in the embodiments of this application, and can obtain a same beneficial effect. To avoid repetition, details are not described herein again.

FIG. 11 is a flowchart of a third charging method according to an embodiment of this application. The charging method is applied to the data cable provided in the embodiments of this application. As shown in FIG. 11, the charging method may specifically include the following steps:

Step 1101: In a case that the data cable is connected to a charger and the charger is connected to a power supply, match the data cable with the charger.

Step 1102: In a case that the charger successfully matches the data cable, drive a second switching unit to connect a second CC pin to a third CC pin, where the second switching unit connects the second CC pin to a charger matching unit by default.

The third charging method provided in this embodiment of this application can implement each process of the data cable provided in the embodiments of this application, and can obtain a same beneficial effect. To avoid repetition, details are not described herein again.

Optionally, an embodiment of this application further provides an electronic device, including a processor, a memory, and a program or an instruction that is stored in the memory and that can run on the processor. When the program or the instruction is executed by the processor, the processes of the embodiments of the first charging method, the second charging method, or the third charging method are implemented, and a same technical effect can be achieved. To avoid repetition, details are not described herein again.

An embodiment of this application further provides a readable storage medium. A program or an instruction is stored in the readable storage medium. When the program or the instruction is executed by a processor, the processes of the embodiments of the first charging method, the second charging method, or the third charging method are implemented, and a same technical effect can be achieved. To avoid repetition, details are not described herein again.

The processor is a processor in the electronic device in the foregoing embodiment. The readable storage medium includes a computer-readable storage medium such as a read-only memory (ROM), a random access memory (RAM), a magnetic disk, an optical disc, or the like.

An embodiment of this application further provides a chip. The chip includes a processor and a communication port, the communication port is coupled to the processor, and the processor is configured to run a program or an instruction to implement the processes of the embodiments of the first charging method, the second charging method, or the third charging method, and a same technical effect can be achieved. To avoid repetition, details are not described herein again.

It should be understood that the chip mentioned in the embodiments of this application may also be referred to as a system-level chip, a system chip, a chip system, or a system on a chip.

It may be understood that the embodiments described in the present disclosure may be implemented by hardware, software, firmware, middleware, microcode, or a combination thereof. For hardware implementation, a module, a unit, a submodule, a subunit, or the like may be implemented in one or more application specific integrated circuits (ASIC), a digital signal processor (DSP), a digital signal processing device (DSP Device, DSPD), a programmable logic device (PLD), a field-programmable gate array (FPGA), a general purpose processor, a controller, a microcontroller, a microprocessor, another electronic unit configured to perform the functions in this application, or a combination thereof.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In the absence of more restrictions, an element defined by the statement "including a . . . " does not exclude another same element in a process, method, article, or apparatus that includes the element. In addition, it should be noted that a scope of the method and the electronic device in the implementations of this application is not limited to: performing a function in a sequence shown or discussed, and may further include: performing a function in a basically simultaneous manner or in a reverse sequence based on an involved function. For example, the described method may be performed in a different order, and various steps may be added, omitted, or combined. In addition, features described with reference to some examples may be combined in other examples.

According to the descriptions of the foregoing implementations, a person skilled in the art may clearly understand that the foregoing method embodiments may be implemented by software and a required universal hardware platform, or certainly may be implemented by hardware. However, in many cases, the former is a better implementation. Based on such an understanding, the technical solutions of this application essentially or the part contributing to existing technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of this application.

The embodiments of this application are described with reference to the accompanying drawings. However, this application is not limited to the foregoing specific implementations. The foregoing specific implementations are merely examples, but are not limiting. A person of ordinary skill in the art may make many forms without departing from the objective and the scope of the claims of this application, and these forms all fall within the protection scope of this application.

The invention claimed is:

1. A charger, comprising a type-A female connector, a Power Delivery (PD) charging processing unit, a non-PD charging processing unit, a data cable matching unit, and a first switching unit; wherein the type-A female connector comprises a first Configuration Channel (CC) GG pin and a first communication pin, the first CC pin is connected to a first end of the first switching unit, a second end of the first switching unit is connected to the PD charging processing unit, a third end of the first switching unit is connected to the data cable matching unit, and the first communication pin is connected to the non-PD charging processing unit; and when the charger is connected to a data cable, if the data cable is a first data cable, the first end of the first switching unit is connected to the second end of the first switching unit, the first end of the first switching unit is disconnected from the third end of the first switching unit, and the charger performs, by the first CC pin, PD charging on a to-be-charged device connected to the first data cable, or performs, by the first communication pin, non-PD charging on a to-be-charged device connected to the first data cable; or when the charger is connected to a data cable, if the data cable is a second data cable, the first end of the first switching unit is connected to the third end of the first switching unit, the first end of the first switching unit is disconnected from the second end of the first switching unit, and the charger performs, by the first communication pin, non-PD charging on a to-be-charged device connected to the second data cable; wherein when the data cable matching unit determines that the charger matches the data cable based on a matching signal transmitted through the first CC pin, the data cable is the first data cable; and when the data cable matching unit determines that the charger does not match the data cable based on the matching signal transmitted through the first CC pin, the data cable is the second data cable.

2. The charger according to claim 1, wherein the first switching unit comprises a first switch and a second switch;

a first end of the first switch is connected to the first CC pin, and a second end of the first switch is connected to the data cable matching unit; and a first end of the second switch is connected to the first CC pin, and a second end of the second switch is connected to the PD charging processing unit; wherein when the charger is connected to the first data cable, the second switch is closed, and the first switch is opened; and when the charger is connected to the second data cable, the second switch is opened, and the first switch is closed.

3. The charger according to claim 1, wherein the non-PD charging processing unit is a charging processing unit of a D+/D− communication protocol, and the first communication pin comprises a D+ pin and a D− pin.

4. The charger according to claim 1, wherein the charger further comprises a first control unit, and the first control unit is separately connected to the data cable matching unit and the first switching unit; wherein the first control unit is configured to: when the data cable matching unit obtains a first matching signal by the first CC pin, drive the first end of the first switching unit to connect to the second end of the first switching unit, and drive the first end of the first switching unit to disconnect from the third end of the first switching unit, wherein the first matching signal is sent by the first data cable connected to the charger.

5. A data cable, comprising a type-A male connector, a type-C port, and a cable connected between the type-A male connector and the type-C port, wherein a charger matching unit and a second switching unit are disposed on the cable;

the type-A male connector comprises a second Configuration Channel (CC) pin and a second communication pin, the cable comprises a Configuration Channel (CC) cable and a communication cable, a first end of the CC cable is connected to the second CC pin, the type-C port comprises a third CC pin and a third communication pin, and two ends of the communication cable are separately connected to the second communication pin and the third communication pin;

a first end of the second switching unit is connected to a second end of the CC cable, a second end of the second switching unit is connected to the charger matching unit, and a third end of the second switching unit is connected to the third CC pin; and when the data cable is connected to a charger, if the charger is a first charger, the first end of the second switching unit is connected to the third end of the second switching unit, the first end of the second switching unit is disconnected from the second end of the second switching unit, and the first charger and the data cable perform Power Delivery (PD) charging on a to-be-charged device connected to the data cable by the third CC pin, or perform non-PD charging on a to-be-charged device connected to the data cable by the third communication pin; or if the charger is a second charger, the first end of the second switching unit is connected to the second end of the second switching unit, the first end of the second switching unit is disconnected from the third end of the second switching unit, and the second charger and the data cable perform non-PD charging on a to-be-charged device connected to the data cable by the third communication pin; wherein when the charging matching unit determines that the charger matches the data cable based on a matching signal transmitted through the second CC pin, the charger is the first charger; and when the charger matching unit determines that the charger does not match the data cable based on the matching signal transmitted through the second CC pin, the charger is the second charger.

6. The data cable according to claim 5, wherein the type-C port further comprises a fourth CC pin, a first resistor is further disposed on the cable, a first end of the first resistor is connected to a VBUS cable in the cable, the second switching unit further comprises a fourth end and a fifth end, the fourth end of the second switching unit is connected to a second end of the first resistor, and the fifth end of the second switching unit is connected to the fourth CC pin; wherein when the data cable is connected to the first charger, the fourth end of the second switching unit is disconnected from the fifth end of the second switching unit; and when the data cable is connected to the second charger, the fourth end of the second switching unit is connected to the fifth end of the second switching unit.

7. The data cable according to claim 6, wherein the second switching unit comprises a third switch and a fourth switch;

a first end of the third switch is connected to a second end of the CC cable, a second end of the third switch is connected to the charger matching unit, and a third end of the third switch is connected to the third CC pin; and a first end of the fourth switch is connected to the second end of the first resistor, and a second end of the fourth switch is connected to the fourth CC pin; wherein when the data cable is connected to the second charger, the first end of the third switch is connected to the third end of the third switch, the first end of the third switch is disconnected from the second end of the third switch, and the fourth switch is opened; and when the data cable is connected to the first charger, the first end of the third switch is connected to the second end of the third switch, the first end of the third switch is disconnected from the third end of the third switch, and the fourth switch is closed.

8. The data cable according to claim 5, wherein the cable further comprises a second control unit, and the second control unit is separately connected to the charger matching unit and the second switching unit; wherein the second control unit is configured to: when the charger matching unit obtains a second matching signal transmitted through the second CC pin, drive the first end of the second switching unit to connect to the third end of the second switching unit, and drive the first end of the second switching unit to disconnect from the second end of the second switching unit; and the second control unit is further configured to: when the charger matching unit does not obtain the second matching signal transmitted through the second CC pin, drive the first end of the second switching unit to connect to the second end of the second switching unit, and drive the first end of the second switching unit to disconnect from the third end of the second switching unit, wherein the second matching signal is sent by the first charger connected to the data cable.

9. The data cable according to claim 5, wherein the second communication pin comprises a second D+ pin and a second D− pin, the third communication pin comprises a third D+ pin and a third D− pin, the communication cable comprises a D+ cable and a D− cable, the second D+ pin and the third D+ pin are separately connected to two ends of the D+ cable, and the second D− pin and the third D− pin are separately connected to two ends of the D− cable; wherein when the data cable is inserted into the charger, at least one of the second D+ pin and the second D− pin is connected to a non-PD charging processing unit in the charger, and the non-PD charging processing unit is a charging processing unit of a D+/D− communication protocol.

10. A charging device, comprising a data cable according to claim 5 and a charger, wherein the charger comprises a type-A female connector, a PD charging processing unit, a non-PD charging processing unit, a data cable matching unit, and a first switching unit; the type-A female connector comprises a first CC pin and a first communication pin, the first CC pin is connected to a first end of the first switching unit, a second end of the first switching unit is connected to the PD charging processing unit, a third end of the first switching unit is connected to the data cable matching unit, and the first communication pin is connected to the non-PD charging processing unit; the data cable is connected to the charger, the first CC pin is connected to the second CC pin, and the first communication pin is connected to the second communication pin; and when the data cable successfully matches the charger, a first end of the first switching unit is connected to a second end of the first switching unit, the first end of the first switching unit is disconnected from a third end of the first switching unit, a first end of the second switching unit is connected to a third end of the second switching unit, and the first end of the second switching unit is disconnected from a second end of the second switching unit; wherein when the data cable is connected to a to-be-charged device, the charging device performs PD charging on the to-be-charged device by the third CC pin or performs non-PD charging on the to-be-charged device by the third communication pin.

11. The charging device according to claim 10, wherein when the charger is connected to a power supply, a first target unit is configured to generate a first matching signal and transmit the first matching signal to a second target unit; and the second target unit sends a second matching signal to the first target unit; wherein when the first target unit receives the second matching signal, the first target unit determines that the first target unit matches the second target unit, and when the second target unit receives the first matching signal, the second target unit determines that the first target unit matches the second target unit, wherein the first target unit is one of the data cable matching unit or the charger matching unit, and the second target unit is the other in the data cable matching unit and the charger matching unit.

12. The charging device according to claim 10, wherein when the charger is connected to a data cable, if the data cable is a first data cable, the first end of the first switching unit is connected to the second end of the first switching unit, the first end of the first switching unit is disconnected from the third end of the first switching unit, and the charger performs, by the first CC pin, PD charging on a to-be-charged device connected to the first data cable, or performs, by the first communication pin, non-PD charging on a to-be-charged device connected to the first data cable; or when the charger is connected to a data cable, if the data cable is a second data cable, the first end of the first switching unit is connected to the third end of the first switching unit, the first end of the first switching unit is disconnected from the second end of the first switching unit, and the charger performs, by the first communication pin, non-PD charging on a to-be-charged device connected to the second data cable; wherein when the data cable matching unit determines that the charger matches the data cable based on a matching signal transmitted through the first CC pin, the data cable is the first data cable; and when the data cable matching unit determines that the charger does not match the data cable based on the matching signal transmitted through the first CC pin, the data cable is the second data cable.

13. The charging device according to claim 12, wherein the first switching unit comprises a first switch and a second switch;

a first end of the first switch is connected to the first CC pin, and a second end of the first switch is connected to the data cable matching unit; and a first end of the second switch is connected to the first CC pin, and a second end of the second switch is connected to the PD charging processing unit; wherein when the charger is connected to the first data cable, the second switch is closed, and the first switch is opened; and when the charger is connected to the second data cable, the second switch is opened, and the first switch is closed.

14. The charging device according to claim 12, wherein the non-PD charging processing unit is a charging processing unit of a D+/D− communication protocol, and the first communication pin comprises a D+ pin and a D− pin.

15. The charging device according to claim 12, wherein the charger further comprises a first control unit, and the first control unit is separately connected to the data cable matching unit and the first switching unit; wherein the first control unit is configured to: when the data cable matching unit obtains a first matching signal by the first CC pin, drive the first end of the first switching unit to connect to the second end of the first switching unit, and drive the first end of the first switching unit to disconnect from the third end of the first switching unit, wherein the first matching signal is sent by the first data cable connected to the charger.

16. The charging device according to claim 10, wherein the type-C port further comprises a fourth CC pin, a first resistor is further disposed on the cable, a first end of the first resistor is connected to a VBUS cable in the cable, the second switching unit further comprises a fourth end and a fifth end, the fourth end of the second switching unit is connected to a second end of the first resistor, and the fifth end of the second switching unit is connected to the fourth CC pin; wherein when the data cable is connected to the first charger, the fourth end of the second switching unit is disconnected from the fifth end of the second switching unit; and when the data cable is connected to the second charger, the fourth end of the second switching unit is connected to the fifth end of the second switching unit.

17. The charging device according to claim 16, wherein the second switching unit comprises a third switch and a fourth switch;

a first end of the third switch is connected to a second end of the CC cable, a second end of the third switch is connected to the charger matching unit, and a third end of the third switch is connected to the third CC pin; and a first end of the fourth switch is connected to the second end of the first resistor, and a second end of the fourth switch is connected to the fourth CC pin; wherein when the data cable is connected to the first charger, the first end of the third switch is connected to the third end of the third switch, the first end of the third switch is disconnected from the second end of the third switch, and the fourth switch is opened; and when the data cable is connected to the first charger, the first end of the third switch is connected to the second end of the third switch, the first end of the third switch is disconnected from the third end of the third switch, and the fourth switch is closed.

18. The charging device according to claim 10, wherein the cable further comprises a second control unit, and the second control unit is separately connected to the charger matching unit and the second switching unit; wherein the second control unit is configured to: when the charger matching unit obtains a second matching signal transmitted through the second CC pin, drive the first end of the second switching unit to connect to the third end of the second switching unit, and drive the first end of the second switching unit to disconnect from the second end of the second switching unit; and the second control unit is further configured to: when the charger matching unit does not obtain the second matching signal transmitted through the second CC pin, drive the first end of the second switching unit to connect to the second end of the second switching unit, and drive the first end of the second switching unit to disconnect from the third end of the second switching unit, wherein the second matching signal is sent by the first charger connected to the data cable.

19. The charging device according to claim 10, wherein the second communication pin comprises a second D+ pin and a second D− pin, the third communication pin comprises a third D+ pin and a third D− pin, the communication cable comprises a D+ cable and a D− cable, the second D+ pin and the third D+ pin are separately connected to two ends of the D+ cable, and the second D− pin and the third D− pin are separately connected to two ends of the D− cable; wherein when the data cable is inserted into the charger, at least one of the second D+ pin and the second D− pin is connected to a non-PD charging processing unit in the charger, and the non-PD charging processing unit is a charging processing unit of a D+/D− communication protocol.

* * * * *